March 10, 1953  T. E. PIAZZE  2,630,732
APPARATUS FOR CUTTING CIRCUMFERENTIAL GROOVES
Filed Jan. 19, 1950
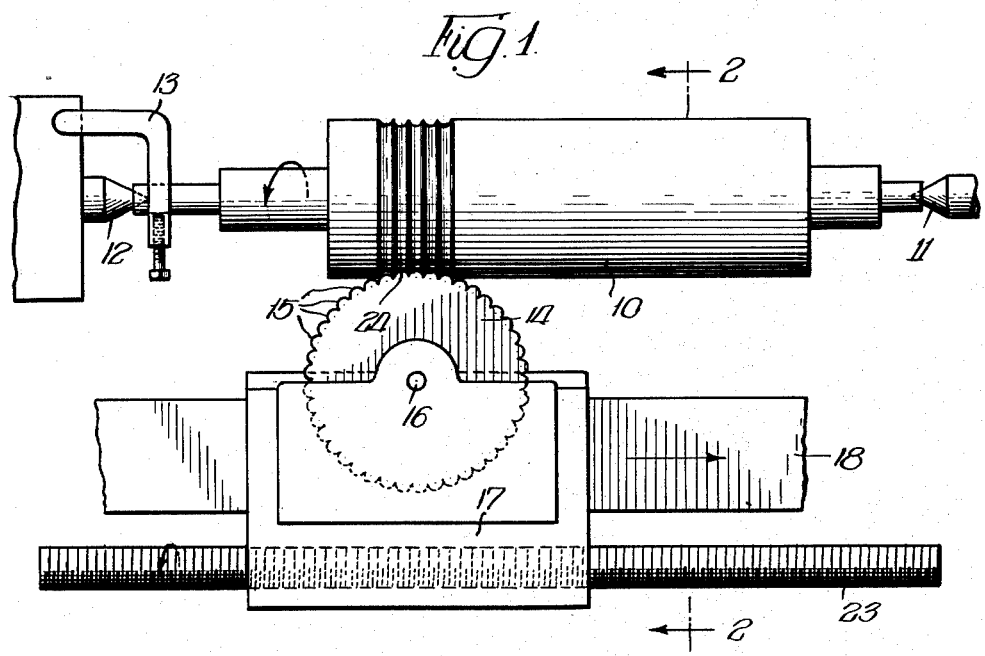
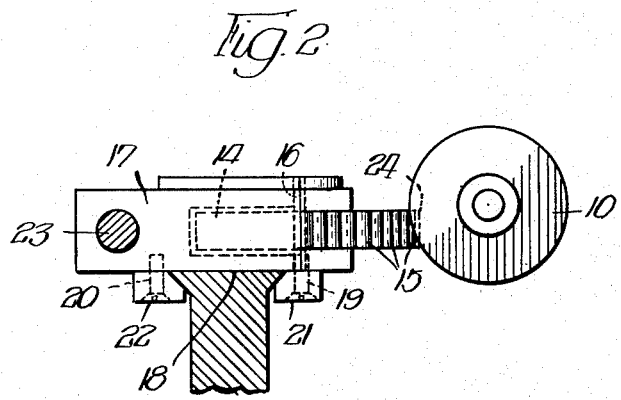
INVENTOR.
Thomas E. Piazze,
BY
Cromwell, Greist + Warden
Attys.

Patented Mar. 10, 1953

2,630,732

UNITED STATES PATENT OFFICE 2,630,732

APPARATUS FOR CUTTING CIRCUMFERENTIAL GROOVES

Thomas E. Piazze, Mount Vernon, Ohio, assignor to Shellmar Products Corporation, Chicago, Ill., a corporation of Delaware Application January 19, 1950, Serial No. 139,390

4 Claims. (Cl. 82—13)

This invention has to do with an apparatus for cutting grooves on a cylinder and is more particularly concerned with an improved multiple cutting tool.

An object of the invention is to provide a cutting device comprising cutting facets on the perimeter of a circular tool, and a mounting means therefor whereby the tool is uniformly driven parallel along the cylinder being cut so as to eliminate the human element of hand operation, and provide greater cutting accuracy.

More specifically it is an object of the invention to provide a pivotally mounted circular cutting tool comprising a set of arcuate cutting teeth uniformly spaced about the perimeter thereof, which tool is uniformly moved in a linear path parallel to the cylinder being worked so as to cut semi-circular grooves in the cylinder defining therebetween uniform circumferential ridges about the periphery of the same.

A further object of this invention is to provide a method for cutting grooved cylinders wherein there is employed a circular tool with extended cutting facets about its periphery, which tool is uniformly rotatably driven parallel to the cylinder as it makes its cut on the cylinder.

Another object of the invention is to provide a means for cutting circumferential grooves in a gravure cylinder leaving uniform ridges defined therebetween which means comprises a circular tool with arcuate cutting facets spaced about its periphery, said tool being moved in cutting relation horizontally along said cylinder by means of a constantly rotating driving screw.

It is a further object of the invention to provide an economical method of making gravure cylinders, wherein grooves are cut to define the embossing ridges, without resort to expensive electronic devices.

Other objects of the invention will in part be obvious and will in part appear hereinafter. For a fuller understanding of the nature of the invention reference should be had to the following detailed description of an embodiment thereof taken in connection with the accompanying drawing in which:

Fig. 1 is a top plan view which shows a tool embodying the principles of the invention in cutting relation with a cylinder such as is used in the gravure field; and Figure 2 is a transverse sectional view taken along the lines 2—2 of Fig. 1.

Referring more particularly to the drawing there is shown a cylindrical metal member 10, of material suitable for a gravure printing cylinder, which is mounted in a standard lathe, for counterclockwise rotation about the spindles 11 and 12 by means of the rotatably driven dog 13.

Heretofore, such printing cylinders have been circumferentially cut by means of a single facet cutting tool which was moved, usually by hand, toward and from the cylinder in the cutting operation, with the result that often the resulting ridges formed on the cylinder were not uniform and not equidistant apart.

In the present invention a uniform cylindrical cutting tool 14 is provided having arcuate semicircular cutting facets 15 about its periphery and placed in cutting relation with the cylinder 10. The tool 14 is freely rotatably mounted by pin 16 in a one piece housing 17.

The housing 17, is slidably mounted upon a guide bar 18 and is held in alignment by means of gibs 19 and 20 which are in turn rigidly attached to the housing 17 by lug bolts 21 and 22.

The entire housing assembly is uniformly moved by a constantly rotating driving screw 23 in horizontal plane passing through the cylinder slightly below the axis of rotation.

The cutting tool 14 is shown in cutting relation with the cylinder at 24, the cutting edge of the tool engaging the cylinder slightly below a horizontal plane through the axis of the cylinder so that the cut is made at an angle sufficient to prevent binding.

As the tool 14 revolves, the outermost facet 24 is applying the finishing cut to a groove on the revolving cylinder 10 while the adjacent facets are cutting the adjacent grooves to lesser depth. The gear-like arrangement of the facets 24 on the tool 14 provides accurate independent ridges on the finished cylinder.

It will thus be seen that the cylinder 10 is rotated toward the operator in a conventional manner, the cutting tool 14 is driven counterclockwise along the cylinder at a constant speed, and effects a uniform accurately ridged cylinder which may be used in embossing, coating or printing webs of material.

While the invention is illustrated in connection with the manufacture of gravure printing cylinders it will be understood that it is applicable to the production of grooved cylinders useful in other arts.

It will thus be seen that the objects hereinbefore set forth are readily and efficiently attained, by the invention and it will be obvious that different embodiments of the invention may be resorted to without departing from the scope thereof.

I claim:

1. An apparatus for uniformly grooving a cylinder comprising a circular cutting tool, said cutting tool having arcuate, uniform cutting facets equally spaced around the periphery thereof, a support for said tool including a longitudinal guide member and a carriage slidable along said guide member, and means for uniformly moving said tool parallel to said guide member, said cutting tool being supported in substantially perpendicular relation to a vertical plane through the axis of said cylinder and mounted slightly below a horizontal plane through the axis of said cylinder.

2. In a lathe, a cylinder cutting assembly comprising a circular cutting tool with uniform cutting facets equally spaced about its perimeter, a holder for said tool, said cutting tool being freely rotatably mounted in said holder about an axis substantially perpendicular to a horizontal plane through the axis of the lathe spindle, guiding and supporting means for mounting said holder for movement in a horizontal path with the mounting axis of said tool moving along a line parallel with the spindle axis, and screw means for uniformly moving said holder along said guiding and supporting means, whereby to impart linear and rotative movement to said tool as the cutting facets thereof are engaged in cutting relation with the cylinder being cut.

3. In a lathe assembly, a circular cutting tool, said cutting tool having peripheral spaced arcuate cutting facets, a support for said tool, a horizontal guide member for said support, means for freely rotatably mounting said cutting tool in said support about an axis substantially parallel with a vertical plane through the axis of the lathe spindle, and a rotatable driving screw for uniformly horizontally moving said support along said guide member with the cutting edge of said tool moving in a plane substantially parallel with a horizontal plane through the axis of the lathe spindle.

4. In a cylinder cutting assembly, a rotatable cutting member of cylindrical section having uniform cutting facets spaced around its periphery, a support for said cutting member, a longitudinal guide member, said support being slidably mounted on said guide member for movement parallel to the axis of the cylinder, said cutting member being freely rotatable on said support with its cutting edge in a plane substantially perpendicular to a vertical plane through the axis of said cylinder and slightly below a horizontal plane through the axis of said cylinder, and means for uniformly moving said support along said guideway whereby to engage the cutting edge of the tool with the surface of the cylinder and to move said tool therealong as it makes its cut.

THOMAS E. PIAZZE.

REFERENCES CITED

The following references are of record in the file of this patent:

UNITED STATES PATENTS

| Number | Name | Date |
| --- | --- | --- |
| 511,607 | Gay | Dec. 26, 1893 |
| 764,145 | McKenna | July 5, 1904 |
| 1,188,469 | Mason et al. | June 27, 1916 |
| 2,164,571 | Christman | July 4, 1939 |
| 2,233,724 | Bannister et al. | Mar. 4, 1941 |
| 2,292,720 | Spence | Aug. 11, 1942 |

FOREIGN PATENTS

| Number | Country | Date |
| --- | --- | --- |
| 126,618 | Great Britain | Apr. 19, 1919 |